UNITED STATES PATENT OFFICE.

ELI BUSH, OF ALEXANDRIA, LOUISIANA.

IMPROVEMENT IN THE CONSTRUCTION OF EMBANKMENTS.

Specification forming part of Letters Patent No. 158,242, dated December 29, 1874; application filed December 9, 1874.

*To all whom it may concern:*

Be it known that I, ELI BUSH, of Alexandria, in the parish of Rapides and State of Louisiana, have invented certain new and useful Improvements in the Construction of Levees or Embankments, to prevent overflow from rivers or other waters; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to the construction of levees or embankments to prevent the overflow from rivers or other waters.

Preparatory to making the levee or embankment, I procure the Spanish moss, (*Tillandsia usneoides*,) and mix the same uniformly with the earth as it is thrown up, forming the levee or embankment throughout its whole length, breadth, and height.

The Spanish moss, (*Tillandsia usneoides*,) growing in great abundance generally in districts where levees are required, is easily obtained at small cost. It does not decay, has great strength, and holds together with great cohesiveness the mass or bulk of the levee to resist abrasion by water and air. It deters and prevents animals, reptiles, and insects from burrowing in the embankment or levee; therefore, no holes or perforations are made by them for the water to run through, to the destruction of the embankment.

I claim as my invention or discovery—

The combination of Spanish moss (*Tillandsia usneoides*) with the earth or other materials for forming the bulk of the embankment or levee, substantially as specified in the foregoing.

In testimony that I claim the foregoing as my own I hereby affix my signature in presence of two witnesses.

ELI BUSH.

Witnesses:
ARMAND GUYOLY,
JOHN STEINER.